United States Patent [19]
Wiley

[11] 3,930,217
[45] Dec. 30, 1975

[54] SONIC LOGGING RECORDING APPARATUS

[75] Inventor: Bruce F. Wiley, Bartlesville, Okla.

[73] Assignee: Phillips Petroleum Company, Bartlesville, Okla.

[22] Filed: Dec. 6, 1973

[21] Appl. No.: 422,268

[52] U.S. Cl. .......... 340/15.5 TN; 324/181; 181/103
[51] Int. Cl.² ...................... G01V 1/40; G04F 10/04
[58] Field of Search ................. 181/102, 103, 107; 340/18 P, 18 R, 15.5 TN; 307/222; 324/181

[56] References Cited
UNITED STATES PATENTS

| | | |
|---|---|---|
| 3,257,639 | 6/1966 | Kokesh ....................... 340/15.5 TN |
| 3,302,166 | 1/1967 | Zemanek, Jr. .................... 340/18 R |
| 3,304,537 | 2/1967 | Schwartz ..................... 340/15.5 TN |
| 3,434,105 | 3/1969 | Schwartz ..................... 340/15.5 TN |

Primary Examiner—Richard A. Farley
Assistant Examiner—H. A. Birmiel

[57] ABSTRACT

Apparatus is disclosed for recording the difference in travel times of acoustical signals from first and second spaced generators to a receiver. An up-down counter is first actuated to count up for a period of time corresponding to the travel time of the signal from the more distant generator to the receiver and is then actuated to count down for a period of time corresponding to the travel time of a signal from the closer generator to the receiver. The output signal from the counter is displayed digitally and/or converted to an analog signal and recorded.

4 Claims, 3 Drawing Figures

SONIC LOGGING RECORDING APPARATUS

Various types of logging equipment have been developed for use in measuring properties of earth formations which are intersected by well bores. One logging procedure involves measuring the velocity of propagation of acoustical signals through surrounding formations to provide information which is useful in the interpretation of seismic records. One form of apparatus which can be employed to make such measurements is described in U.S. Pat. No. 3,734,233.

In accordance with this invention, improved apparatus is provided for recording the difference in travel times of two acoustical signals which travel different distances through a well bore and surrounding earth formations. The signals are measured by the use of equipment which comprises first and second acoustical signal generators which are spaced different distances from a receiver. The apparatus of this invention utilizes an up-down counter. The counter is actuated by signals from a relatively high frequency oscillator. A first gate circuit is provided to actuate the counter to count up for a period of time corresponding to the travel time of an acoustical signal from the distant generator to the receiver. Thereafter, a second gate is actuated to cause the counter to count down for a period of time corresponding to the travel time of an acoustical signal from the closer generator to the receiver. The residual count remaining on the counter thus provides an indication of the difference in travel times of the two signals. This difference can be displayed digitally and/or converted to analog form and recorded.

Figure 1:
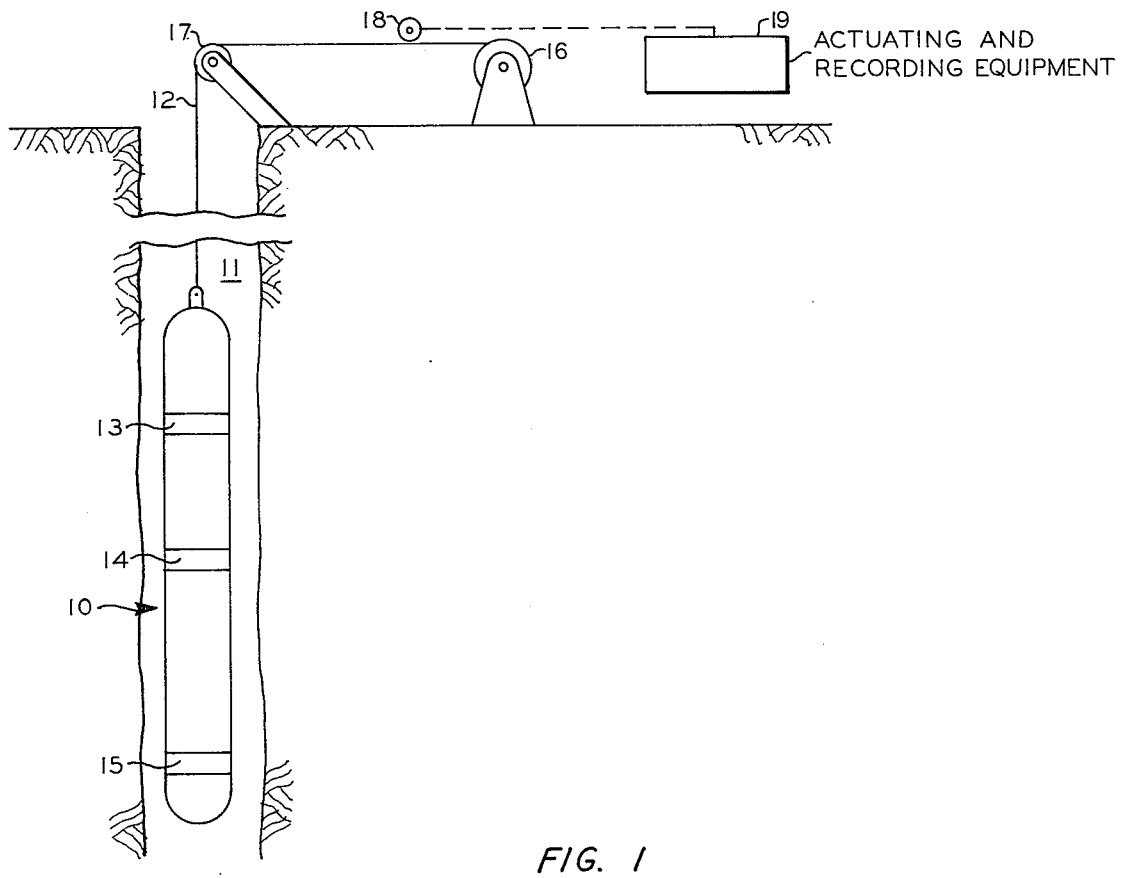
FIG. 1 illustrates acoustical logging equipment positioned in a well bore.

Referring now to the drawing in detail and to FIG. 1 in particular, there is shown an elongated housing 10 which is suspended within a well bore 11 by means of a cable 12. Housing 10 carries two spaced acoustical signal generators 13 and 14 and an acoustical signal receiver 15. These elements are carried by the housing so that the distance between generator 13 and receiver 15 is greater than the distance between generator 14 and receiver 15. The upper end of cable 12 is connected to a reel 16 which serves to raise and lower housing 10 in the well bore. Reel 16 can be driven by a suitable motor, not shown. Cable 12 extends from reel 16 over a pulley 17. An odometer wheel 18 engages cable 12 to provide a signal representative of the depth to which housing 10 is lowered into the bore hole. This signal can be recorded so as to be correlated with the measurements provided by the apparatus of this invention. The electrical components of the apparatus carried by housing 10 are connected to actuating and recording equipment 19 by leads which extend through cable 12.

Figure 2:
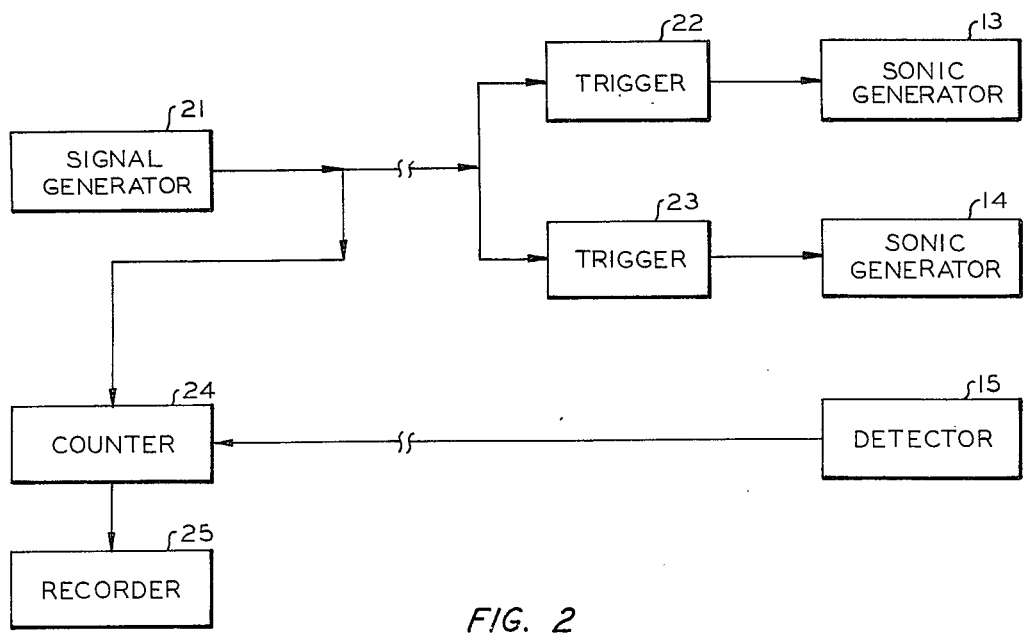
FIG. 2 illustrates schematically the electrical components of the signal actuating and recording equipment employed with the apparatus of FIG. 1.

As illustrated in FIG. 2, an electrical signal generator 21 is positioned at the surface to actuate the down hole acoustical signal generators. A first signal from generator 21 is applied to a trigger circuit 22 which in turn actuates generator 13. A second signal from generator 21 is applied to a second trigger circuit 23 which actuates generator 14. Signal generator 21 can correspond to signal generator 60 of FIG. 4 of U.S. Pat. No. 3,734,233, for example. The two trigger circuits and the acoustical signal generators can correspond to the apparatus illustrated in the upper right-hand portion of FIG. 4 of that patent. In one embodiment of this invention, signal generator 21 can provide a square wave output pulse which actuates one of the trigger circuits on the positive going pulse and the other trigger circuit on the negative going pulse. In a second embodiment, generator 21 can provide positive and negative "ramp" signals, one of which actuates the first trigger circuit and the other the second. The period of the output signal from generator 21 can advantageously be of the order of 50 milliseconds, for example. The two acoustical signal generators can be actuated alternately or independently at this frequency, or at any desired frequency.

An output signal from detector 15 and a control signal from generator 21 are applied to a counter 24, the output of which is applied to a recorder 25. Counter 24 and recorder 25 are illustrated in greater detail in FIG. 3. A first input terminal 26 receives an output signal from detector 15. Terminal 26 is connected by a capacitor 27 to the first input of an amplifier 28, the second input of which is connected to ground. The first input of amplifier 28 is connected by resistors 29 and 30 to ground. A resistor 31 is connected between the contactor of a potentiometer 32 and the junction between resistors 29 and 30. The end terminals of potentiometer 32 are connected to a source of positive potential 33 and to ground, respectively. The output of amplifier 28 is connected to the first input of a NAND circuit 34. A resistor 35 is connected between the output of amplifier 28 and a source of positive potential 36.

Figure 3:
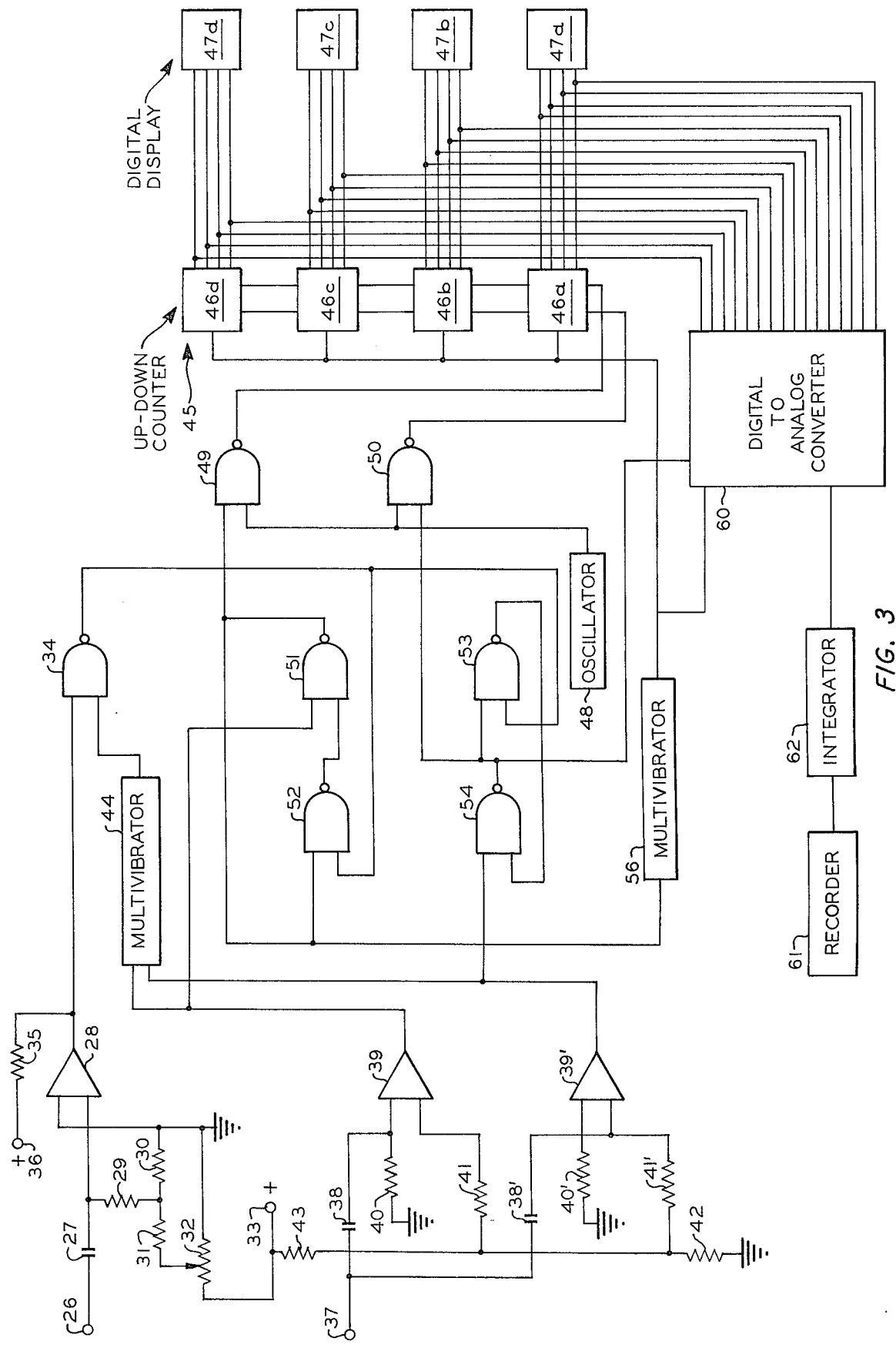
FIG. 3 is a schematic circuit drawing of the recording equipment of this invention.

The output of signal generator 21 of FIG. 2 is connected to input terminal 37 of FIG. 3. This terminal is connected by a capacitor 38 to the first input of an amplifier 39. The first input of amplifier 39 is connected to ground by a resistor 40. The second input of amplifier 39 is connected to ground by resistors 41 and 42. A resistor 43 is connected between potential terminal 33 and the junction between resistors 41 and 42. Terminal 37 is also connected to the second input of an amplifier 39'. The remainder of the circuit elements associated with this second amplifier correspond to those associated with amplifier 39 and are designated by like primed reference numerals. The outputs of amplifiers 39 and 39' are connected to the respective inputs of a single-shot multivibrator 44. The output of multivibrator 44 is connected to the second input of NAND circuit 34.

The recording apparatus of FIG. 3 includes a digital up-down counter 45 having four registers 46a, 46b, 46c and 46d. These registers are connected to associated digital display units 47a, 47b, 47c and 47d. Counter 45 can be a commercially available counter such as the Texas Instruments Incorporated, Dallas, Texas, Model SN74192 counter, for example. If a total number of counts greater than 9,999 is anticipated, additional registers and digital display units can be provided. The counter is energized by an oscillator 48 which has a relatively high frequency, such as one megaherz, for example. Oscillator 48 is connected to first inputs of NAND circuits 49 and 50. The outputs of these two circuits are connected to the respective up and down of the counter.

Circuits 49 and 50 are controlled by a logic network which comprises four NAND circuits 51, 52, 53 and 54. The output of circuit 34 is connected to the second inputs of circuits 52 and 53. The output of amplifier 39 is connected to the first input of circuit 51, and the output of amplifier 39' is connected to the first input of circuit 54. The output of circuit 52 is connected to the second input of circuit 51. The output of circuit 51 is connected to the first input of circuit 49 and to the input of a reset multivibrator 56. The output of circuit 54 is connected to the first input of circuit 53 and to the second input of circuit 50 and to the first input of circuit 53. The output of circuit 53 is connected to the second input of circuit 54. The output of multivibrator 56 is connected to the reset terminals of the registers of counter 45.

In the operation of the acoustical logging equipment, a first signal from generator 21 of FIG. 2 is applied through amplifier 39 to multivibrator 44 and the logic network to actuate counter 45 to begin counting up. The counter continues to count up until a signal greater than preselected amplitude, as determined by the setting of potentiometer 32, is received by detector 15. A threshold level is provided so that low noise signals do not trigger the circuit. High level noise is prevented from prematurely stopping the count by action of multivibrator 44. When signal from generator 21 is applied, output of multivibrator 44 goes to the on or high state and inhibits NAND gate 34 for a period of time. The on time is preset to approximately the shortest anticipated arrival time for the desired signal. The output signal from amplifier 28 is applied to circuit 34 and the logic network to turn off the up counts. The digital display at this time is indicative of the travel time of an acoustical signal from generator 13 to receiver 15. A second pulse from generator 21 actuates sonic generator 14 and is applied through amplifier 39' to the logic network to start counter 45 counting down. This continues until a second signal received by detector 15 is applied to circuit 34 to once again turn off the counter. The residual count remaining on the digital display is thus indicative of the difference in travel times of the two acoustical signals. Multivibrator 56 is actuated momentarily when a first pulse is transmitted through amplifier 39 to clear the counter at the beginning of a second cycle.

The output signals from the registers of the counter can also be connected to a digital-to-analog converter 60. The output of this converter can be applied through an integrator to a recorder 62 which provides an analog signal corresponding to the output of counter 45. Converter 60 can be actuated by the signal which turns off the counter after it has counted down so that only the residual counts are converted to an analog signal. A reset signal is applied to converter 60 from multivibrator 56. Integrator 61 serves to smooth the analog signals when a series of measurements are made at different depths.

While this invention has been described in conjunction with a presently preferred embodiment, it should be evident that it is not limited thereto.

What is claimed is:

1. In an acoustical logging device which includes first and second acoustical signal generators spaced from one another and an acoustical receiver spaced a first distance from said first generator and a second lesser distance from said second generator; apparatus to measure the difference in times of propagation of acoustical signals from the two generators to the receiver, comprising:

an up-down digital counter having first and second inputs;

first means to actuate said first generator to generate an acoustical signal and to actuate said counter to count up at a first time;

second means responsive to an acoustical signal being received by said receiver at a second time following said first time to stop said counter from counting up;

third means to actuate said second generator to generate an acoustical signal and to actuate said counter to count down at a third time; and fourth means responsive to an acoustical signal being received by said receiver at a fourth time following said third time to stop said counter from counting down;

said first, second, third and fourth means including first, second, third, fourth, fifth, sixth and seventh NAND circuits, each having first and second inputs and an output; means connecting said receiver to the first input of said first NAND circuit; a multivibrator having first and second inputs and an output; means to apply a pulse to the first input of said multivibrator and to the first input of said fourth NAND circuit when said first generator is actuated; means to apply a pulse to the second input of said multivibrator and to the first input of said seventh NAND circuit when said second generator is actuated; an oscillator connected to the second input of said second NAND circuit and to the first input of said third NAND circuit; means connecting the output of said multivibrator to the second input of said first NAND circuit; means connecting the output of said first NAND circuit to the second input of said fifth NAND circuit and to the second input of said sixth NAND circuit; means connecting the output of said fourth NAND circuit to the first input of said second NAND circuit and to the first input of said fifth NAND circuit; means connecting the output of said seventh NAND circuit to the second input of said third NAND circuit and to the first input of said sixth NAND circuit; means connecting the output of said sixth NAND circuit to the second input of said seventh NAND circuit; means connecting the output of said fifth NAND circuit to the second input of said fourth NAND circuit; means connecting the output of said second NAND circuit to the first input of said counter; and means connecting the output of said third NAND circuit to the second input of said counter.

2. The apparatus of claim 1 wherein said counter has a reset input, and means connected to the output of said fourth NAND circuit to apply a reset signal to said reset input.

3. The apparatus of claim 1, further comprising a digital-to-analog converter connected to said counter, and means to measure the output of said converter.

4. The apparatus of claim 3 wherein said means to measure comprises an integrator and a recorder.

* * * * *